Patented June 17, 1930

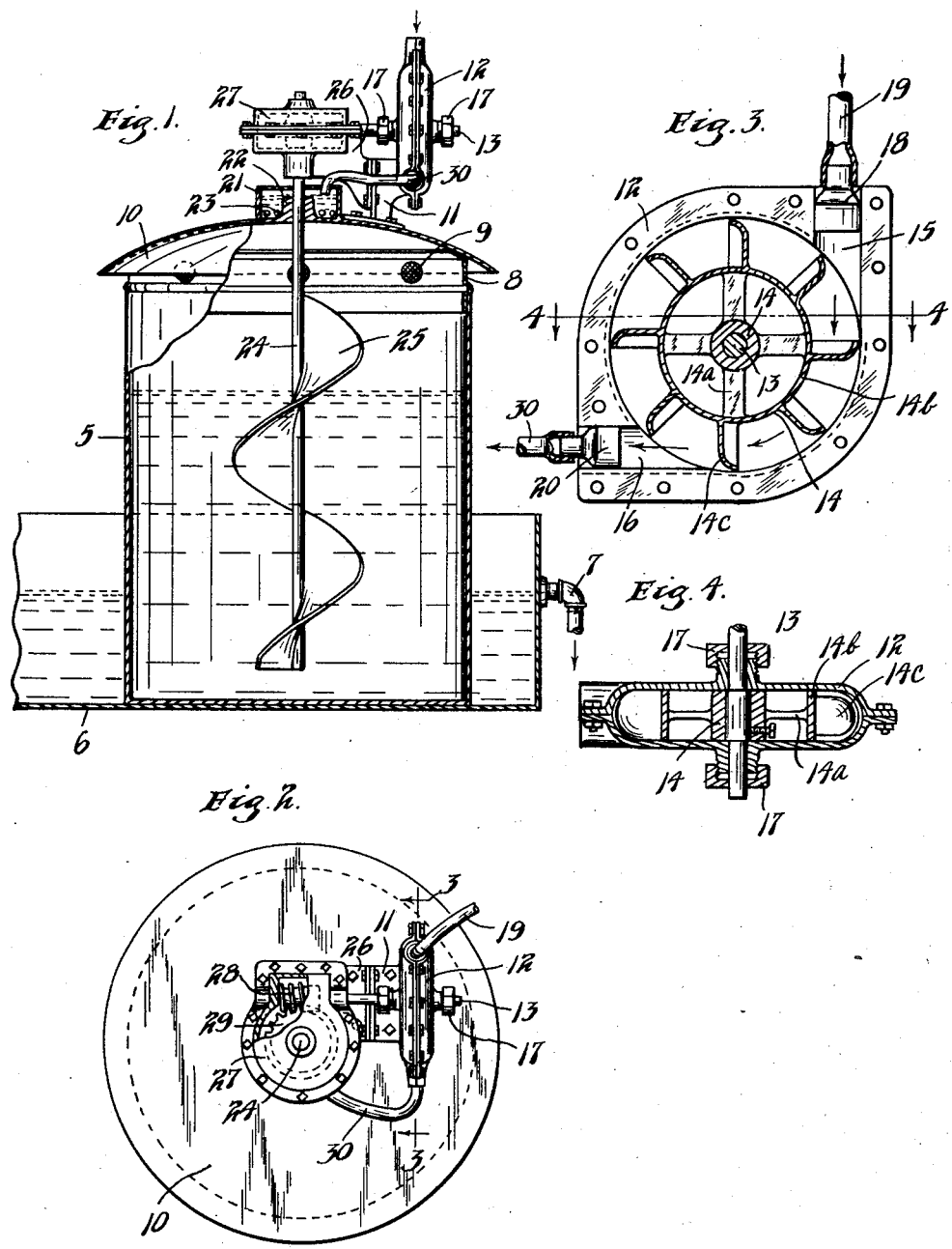

1,764,269

UNITED STATES PATENT OFFICE

RALPH B. LATTERELL, OF KANDIYOHI, MINNESOTA

MILK COOLER AND AERATOR

Application filed May 7, 1928. Serial No. 275,772.

This invention relates to milk aerators and coolers adapted to draw off the animal heat from milk fresh from the cows.

It is an object of this invention to provide a novel and improved milk aerator and cooler which is assembled in a single unit and is adapted to be applied as a unit to cover the openings in various milk cans of standard construction.

To this end, the invention consists in the novel parts and novel combinations of parts hereinafter defined in the claims and described in the following specification, made in connection with the accompanying drawings, wherein like reference characters refer to the same or similar parts throughout the various views and, in which, Fig. 1 is a view in side elevation of the device applied to a standard milk can resting within a water reservoir, certain of the parts being broken away and shown in section;

Fig. 2 is a plan view of the device, certain of the parts being broken away and shown in section;

Fig. 3 is a vertical section taken through the water motor on the line 3—3 of Fig. 2, as is indicated by the arrows, and Fig. 4 is a horizontal section through the water motor taken on the line 4—4 of Fig. 3, as is indicated by the arrows.

Referring to the drawings, a cylindrical milk can 5 is illustrated having an annular opening at its upper end and the milk can is shown as resting within a water reservoir 6, partially filled with water and having the overflow conduit 7 extending from one side thereof in spaced relation from the bottom of the reservoir. In accordance with the present invention, a cap is provided which is adapted to fit on the upper annular open end of a receptacle such as the milk can 5. This cap comprises an annular band 8 adapted to fit within or over the upper annular edge of the can 5 and having a circumferential bead approximately midway of its height adapted to seat against the upper edge of the can 5. A plurality of screened openings 9 are formed in the band 8 above the bead thereon and an upwardly and inwardly projecting flange is provided at the top of the band. A dome-shaped lid 10 fits over the top of the band 8, is secured to the upwardly and inwardly projecting flange thereon and is of slightly greater diameter at its lower edge than the band 8, so that the outer edges of the lid will project beyond the band 8 and the upper top end of the can 5, to form eaves for the drainage of water from the lid to prevent water from draining into the can 5 through the openings 9 and from the joint between the band 8 and the top of the can. A suitable bracket 11 carrying a water motor is bolted or otherwise fixed to the top of the lid 10. The water motor comprises a split casing 12 within which a motor shaft 13 is journaled and a water wheel 14 is fixed on the shaft 13 and situated within the casing 12. A tangential inlet port 15 is provided in the casing 12 at its upper end and extends vertically downwardly to lead into the chamber formed in the casing. A tangential outlet port 16 is formed at the lower side of the casing to project outwardly in a horizontal plane from the chamber of the casing and the two ports 15 and 16 are set at approximately 180° angles from each other relative to the axial center of the shaft 13. The water wheel 14 has a central hub portion fixed to shaft 13 and radial arms $14^a$ project outwardly from the hub to a hollow cylindrical portion $14^b$ which, in turn, carries a plurality of cups $14^c$. The hollow cylindrical portion $14^b$ is of such width as to almost abut the two walls of the split casing 12. Packing glands 17 are threaded on to outer hubs on the split casing 12 through which the shaft 13 extends. A nipple 18 is secured in the inlet port 15 of the water motor and a water supply tube 19, preferably of flexible rubber, is secured to the nipple 18 and is adapted to be attached to any suitable water supply, such, for example, as a water faucet. A nipple 20 is secured in the outlet port 16 and a tube 30 extends from the nipple 20 and through the upper end of a cylindrical casing 21 formed at the top central portion of the lid 10 above a central hub 22. The casing 21 adjacent its lower edge is provided with a plurality of radial holes 23 for dissipation of water to the top of the lid 10. A vertical propeller shaft 24 is journaled in the hub 22 and projects downwardly therefrom to adjacent the bottom of the can 5 and carries below the lid 10 a helical stirrer 25. A suitable bracket 26, preferably fixed to the bracket 11, carries a split casing 27 situated above the central portion of the lid and in substantially the same vertical plane as the motor shaft 13. The motor shaft 13 is journaled at one end within the casing 27 and carries a worm 28 within the casing which drives a worm gear 29 secured to the upper end of the propeller shaft 24 which projects through and is journaled within a hub in the lower side of the casing 27.

It will be observed that the water motor, the propeller shaft 24, the stirrer 25, the driving mechanism and the casing 21 are all mounted on the lid 10 which, in turn, is secured to the band 8. All the mechanism of the present device, therefore, is assembled in a single unit. When it becomes desirable to aerate and cool milk which is fresh from a cow, to carry off the animal heat in the milk and thus prevent the milk from spoiling, the present device is applied to a milk can containing the milk by simply fitting the band 8 into the top opening of the milk can, as illustrated. The milk can 5 will preferably be placed within a reservoir 6 containing cool water, which extends for some little distance upwardly from the bottom of the can. The tube 19 is connected to a suitable cold water supply (not illustrated) and the water turned on. The water wheel 14 will now be driven to rotate the drive shaft 13 to, in turn, actuate the shaft 24 through the worm 28 and worm gear 29. The helical stirrer 25 will thus be rapidly rotated to stir the milk in the milk can. The water exhausted from the water motor will run from the exhaust port 16 through the nipple 20 and tube 30 to the casing 21 and will be dissipated therefrom through the radial openings 23 to the main portion of the top surface of the lid 10. This water will cool the lid and will run off the lower edges thereof into the reservoir 6 without running into the milk can. The screened openings 9 will exclude insects and other vermin from the milk can and will yet permit the admission and exhaust of air into and out of the milk can. As the milk will be kept in motion by the stirrer 25 and as the top 10 will be kept quite cool from the water running over the same, and also as cool water will be preferably held within the reservoir 6, the animal heat in the milk will be quickly driven off and the milk will be cooled and aerated to prevent putrifactive fermentation taking place in the milk. The helical stirrer 25 will act to carry a large quantity of air into the milk to purify the same. When milk in one can has been thoroughly cooled and aerated, the present device can be readily removed as a unit and applied to other cans, to cool and aerate milk contained therein.

The device is simple and efficient in operation and can be easily and cheaply constructed.

It will, of course, be understood that various changes may be made in the form, details, arrangement and proportions of the various parts without departing from the scope of the present invention.

What is claimed is:

1. An aerating and cooling device for milk, assembled in a single unit and adapted to be applied to cover the top of a milk can, said device comprising a cap adapted to fit within the top of a milk can and having portions adapted to overlie the top of the milk can, a water motor fixed to said cap, means for exhausting water after passing through said motor on the top of the cap to cool the same, a stirring shaft projecting through said cap and adapted to be placed within the milk in a milk can to stir the same, and means for driving said shaft from said water motor, said cap having a plurality of air openings situated below the overlying portions thereof, for the admission and exhaust of air to and from the milk can.

2. An aerating and cooling device for milk, assembled in a single unit and adapted to be applied to the top of a milk can, said device comprising an annular beaded band adapted to be fitted within the annular top opening of a milk can, a dome-shaped lid secured to the upper edge of said band and adapted to overlie the top of the milk can, a propeller shaft journaled in said lid and projecting downwardly therefrom to be situated within the milk in the can, stirring means on said shaft, means secured to said lid for rotating said shaft, means for supplying water to the top of said lid to cool the same, said band having a plurality of openings therethrough for the admission and exhaust of air to and from the milk can.

3. An aerating and cooling device for milk, assembled in a single unit and adapted to be applied to cover the top of a milk can, said device comprising a dome-shaped cap adapted to be secured in the top opening of a milk can to overlie the same, said cap having a plurality of openings therein, for the admission and exhaust of air to and from the milk can, a vertical shaft journaled in said cap and adapted to project downwardly therefrom into the milk of the milk can, stirring means mounted on said shaft, a water motor fixed to the top of said cap, means for driving said shaft from said water motor, an annular casing formed at the top central portion of the said cap and having a plurality of circumferential openings therein, and a conduit leading from the exhaust port of said water motor to the interior of said casing.

4. The combination with a milk can, of an aerating and cooling device comprising a band adapted to fit within the top of said can and having a bead adapted to bear against the top of the can, a dome shaped lid mounted on the top of said band and having edges projecting beyond the top edge of said can, a water motor mounted on the top of said lid, a shaft journaled within said lid and extending downwardly into said can, a stirring means carried on said shaft, means for driving said shaft from said water motor, a casing mounted on the central portion of the top of said lid and having a series of peripheral holes therein, and means for supplying the exhaust water from said water motor to said casing to permit the same to run over the top of said lid and to drain from the projecting portions at the edges of said lid.

5. An aerating and cooling device for milk, comprising a cover adapted to be attached to the top of a milk can, said cover member having a top portion adapted to overhang the upper edge of the milk can, and an annular member adapted to telescope with the upper edge of the milk can, a water motor fixed to said cover member, means for exhausting water after passing through said motor on the top portion of said cover, a stirring shaft projecting through said cover and adapted to be disposed within the contents of said milk can, driving connections between said stirring shaft and said motor, the annular portion of said cover member having air openings therein.

6. In an aerating and cooling device for milk, a cover member adapted to be applied to the top of a milk can comprising a dish-shaped top of slightly larger area than the diameter of a milk can and adapted to overhang the upper end thereof, an annular member secured to said top and adapted to telescope with the upper edge of a milk can, said annular member having air openings therein, a water motor fixed to said top, a chamber concentrically mounted on the top of said cover and connected with the exhaust of said water motor, said chamber having a series of circumferentially spaced outlet passages for distributing exhaust water over said cover and about the sides of the milk can, and a stirring shaft projecting through said cover and rotatably connected thereto and driving connections between the upper end of said shaft and said water motor.

In testimony whereof I affix my signature.

RALPH B. LATTERELL.